United States Patent [19]

McMath

[11] Patent Number: 5,034,075
[45] Date of Patent: Jul. 23, 1991

[54] METHOD FOR ENCAPSULATING AND CONTAINING ASBESTOS ON POWER PLANT EQUIPMENT

[76] Inventor: William H. McMath, 857 Gen. George Patton Rd., Nashville, Tenn. 37221

[21] Appl. No.: 661,552

[22] Filed: Feb. 26, 1991

[51] Int. Cl.$^5$ .............................................. E04B 2/00
[52] U.S. Cl. ................... 156/71; 427/196; 427/206; 427/359; 427/368; 427/407.1; 427/426; 427/427; 423/DIG. 20
[58] Field of Search ............... 427/194, 195, 206, 359, 427/368, 407.1, 407.3, 426, 427, 196; 423/DIG. 20; 156/71

[56] References Cited

U.S. PATENT DOCUMENTS

| | | | |
|---|---|---|---|
| 4,369,203 | 1/1983 | Hansen | 427/10 |
| 4,640,848 | 2/1987 | Cerdan-Diaz et al. | 427/426 |
| 4,770,117 | 9/1988 | Hetherington et al. | 427/196 |
| 4,835,831 | 6/1989 | Melton | 427/427 |

*Primary Examiner*—Shrive Beck
*Assistant Examiner*—Benjamin L. Utech
*Attorney, Agent, or Firm*—Mark J. Patterson; Edward D. Lanquist, Jr.

[57] ABSTRACT

The present invention discloses a method for encapsulating and containment of asbestos covered workpieces such as power equipment material. A resin and catalyst mix is applied to the asbestos covered surface. Glass is applied with the resin or after the resin. The surface is then compacted by brushing or rolling, to provide consistent application and to remove air bubbles. In certain instances, this material is applied to a chopped roving which is then applied to the surface prior to compaction. In the preferred embodiment, a chopper gun is used to apply the resin, catalyst, and glass mixture.

11 Claims, No Drawings

METHOD FOR ENCAPSULATING AND CONTAINING ASBESTOS ON POWER PLANT EQUIPMENT

BACKGROUND OF THE INVENTION

The present invention relates generally to a method for encapsulating and containing asbestos on power plant equipment, and more particularly to a method for encapsulating and containing the asbestos on power plant equipment, instead of removal, through use of a resin and glass fiber material.

It will be appreciated by those skilled in the art that in the past, power plant equipment such as steam and hot water pipes, turbines, feed water heaters, condensers, hot air ducts, wind boxes, and the like were coated with asbestos to prevent fires. Unfortunately, this practice has led to asbestos being a danger to workers in the area, because as asbestos ages, fibers from the asbestos enter the air and enter the respiratory systems of individuals. To this end, there have been several attempts to remove this asbestos danger from power plant equipment.

One such attempt is the removal of the asbestos by some type of scraping or cutting from the power plant equipment. Unfortunately, studies have shown that this method actually increases the amount of airborne asbestos fibers in the area, thereby increasing the danger. Studies have shown that the asbestos needs be covered.

Another attempt is to encapsulate and contain the equipment in some type of metal, such as an aluminum sheet jacket. However, this method has problems such as cost and the ability to seal joints.

What is needed, then, is a method to encapsulate and contain asbestos on power plant equipment that is quick and efficient to use. This needed method must be cost effective. This needed method must be able to withstand the differences in temperature experienced by power plant equipment and the wear and tear suffered by the coating. This needed method must encapsulate and contain the asbestos instead of removal, to prevent an increase in airborne asbestos fibers. This method must have consistent encapsulation and containment properties, even at joints. These properties are presently lacking in the prior art.

SUMMARY OF THE INVENTION

In the present method, a mixture of resin, glass, and a catalyst is applied to the surface of power plant equipment to encapsulate and contain the asbestos. In the preferred embodiment, an unsaturated polyester resin is used as the resin. Methyl ethyl ketone peroxide is used as a catalyst. Glass fibers are used for the glass. This can be applied by either by spray with a chopper gun, placed on a mat, cloth, or stitch mat by hand; or applied with a brush. Certain pigments may be added according to OSHA requirements or according to the user's desire. This method can be used to encapsulate and contain asbestos on any type of power plant equipment such as pipes, turbines, and the like.

Accordingly, an object of the present invention is to provide a method for encapsulating and containing asbestos on power plant equipment that is quick and efficient.

Still another object of the present invention is to provide a method for asbestos encapsulation and containment that is cost effective.

Another object of the present invention is to provide a method of asbestos encapsulation and containment that can withstand the temperature extremes in power plant equipment and the wear and tear experienced by the coating and the workpiece.

Still another object of the present invention is to encapsulate and contain asbestos as opposed to removing it.

Another object of the present invention is to provide consistent properties throughout the surface, including at joints.

DESCRIPTION OF THE PREFERRED EMBODIMENT

A resin, glass, and catalyst are combined and applied to the surface of the asbestos on power plant equipment. These three materials are combined to form a bonding fiberglass. In the preferred embodiment, unsaturated polyester resin, which is a thermal setting polymer that is classified as a plastic, is used as the resin. Methyl ethyl ketone peroxide, which is a strong oxidizing agent, is used as the catalyst. Glass fibers in the form of chopped fibers, mat, or cloth are used for application.

In one method, a chopper gun is used to simultaneously spray the chopped glass and the catalyzed resin on the surface. This sprayed glass and resin is then rolled out or brushed to provide a consistent surface.

This material can also be applied by hand by placing a net, cloth, or stitch mat containing glass fibers and catalyzed resin on the surface to be covered. In essence, the surface is wrapped with this material. After the wrapping is complete, the wrapped section is then conditioned with either a roller or brush to ensure that all glass fibers are saturated with resin and are smooth and free of air pockets.

Any color pigment can be added to the mix, according to the user's desire or according to OSHA requirements for type of equipment, temperature, and pressure.

In the preferred embodiment, the sealant is approximately ⅛ inch in thickness or thicker. However, any thickness can be used as long as the fire retardant capabilities of the resin is maintained.

In the preferred embodiment, the unsaturated polyester resin is in the amount of substantially sixty percent by weight. A styrene monomer is used in the amount of substantially forty percent by weight. Epichlorohydrin is used at substantially ½ percent by weight. Because of the sensitivity of the methylethyl ketone peroxide catalyst, the chopper gun mixture must be performed inside the gun in order to ensure that none of the catalyst comes out by itself, which would occur in an external mix. In the preferred embodiment, substantially five percent by weight of antimony pentaoxide is combined with the styrene monomer to form the resin. This forms a chlorendic-based resin.

In the preferred embodiment, a Venus-Gusmer, low pressure airless chopper gun is used, having an internal mix. This gun uses low pressure without air assistance, which produces large droplets which remain within the spray pattern, resulting in less overspray and a much better working environment.

As discussed previously, the present method can be performed using either a hand preparation or a spray or spray up. A hand lay up is a process of applying the material, resin, and fiberglass by hand, using a brush or roller, without the aid of spray equipment. In a spray up, chopped or continuous glass is sprayed simultaneously or alternately with catalyzed resin onto the surface.

In a hand lay up, the resin is pre-catalyzed and then applied to the surface using a brush or nap roller. A precut sheet of mat or woven material is placed onto the wetted surface and rolled or brushed to remove the air voids and ensure consistent application. If the laminate is mat only, a roller or brush is used. If the laminate contains a woven material, the woven material is put behind the mat, and then a squeegee is used.

In a spray up, substantially 1½ inch glass fibers are deposited simultaneously with catalyzed resin onto the surface. This is performed by a hand operated chopper gun that chops glass and sprays catalyzed resin so that the two merge and are directed onto the surface. Because there is no need for other types of matting or roving material, this method uses the least expensive raw materials.

The spray method can be used on large surfaces such as hot air ducts and feed water heaters. However, a hand application must be used on pipes and seals that are too small to be effectively sprayed.

Thus, although there have been particular embodiments of the present invention of a new and useful method for encapsulating and containing asbestos on power plant equipment, it is not intended that such references be construed as limitations upon the scope of this invention, except as set forth in the following claims. Further, although there have been described certain dimensions used in the preferred embodiment, it is not intended that such dimensions be construed as limitations upon the scope of this invention, except as set forth in the following claims.

What I claim is:

1. A method for encapsulating and containing asbestos on a workpiece comprising:
   a. mixing a polyester resin and a catalyst;
   b. covering said workpiece with said mixture; and
   c. applying glass fibers to said mixture.

2. The method of claim 1 wherein said mixture comprises:
   a. antimony pentaoxide;
   b. styrene monomer; and
   c. epichlorohydrin.

3. The method of claim 1 wherein said steps of mixing, covering, and applying are performed by a chopper gun sprayer.

4. The method of claim 1 wherein said step of covering comprises a mat, cloth, or stitch mat.

5. The method of claim 1 further comprising the step of rolling or brushing said glass applied mixture covered workpiece.

6. A method for encapsulating and containing asbestos on a workpiece comprising:
   a. mixing a resin and a catalyst in a chopper gun;
   b. spraying said mixture on said asbestos;
   c. spraying chopped glass on said surface; and
   d. compacting said sprayed surface.

7. The method of claim 6 wherein said spraying of said mixture and said spraying of said glass occur at the same time.

8. A method for encapsulating and containing asbestos on a workpiece comprising:
   a. mixing a resin and a catalyst;
   b. covering a roving means with said mixture;
   c. applying glass to said roving means;
   d. placing said roving means on said surface; and
   e. compacting said placed roving means.

9. The method of claim 8 wherein said roving means comprises a roving, mat, or cloth.

10. The method of claim 8 wherein said covering of said roving means and said applying of said roving means occurs at the same time.

11. The method of claim 8 wherein said compacting comprises either rolling or brushing.

* * * * *